United States Patent [19]

Jones

[11] Patent Number: 5,692,806

[45] Date of Patent: Dec. 2, 1997

[54] SLIP-ON SEAT BELT TENSION ADJUSTMENT CLIP

[76] Inventor: Marc C. Jones, 908 Wemar Way, Montebello, Calif. 90640

[21] Appl. No.: 739,193

[22] Filed: Oct. 30, 1996

[51] Int. Cl.$^6$ .......................... A44B 21/00; B60R 22/00
[52] U.S. Cl. .......................... 297/483; 24/561; 280/808
[58] Field of Search .......................... 297/482, 483; 24/545, 546, 555, 561, 562, 571; 280/808

[56] References Cited

U.S. PATENT DOCUMENTS

| | | | |
|---|---|---|---|
| 1,444,030 | 2/1923 | Leather | 24/561 X |
| 3,797,076 | 3/1974 | Watkin | 24/562 |
| 4,726,625 | 2/1988 | Bougher | 297/483 |
| 5,005,910 | 4/1991 | Itkis et al. | 297/483 |
| 5,201,099 | 4/1993 | Campbell | 297/483 X |
| 5,495,644 | 3/1996 | Mesher et al. | 24/545 X |

*Primary Examiner*—Peter R. Brown
*Attorney, Agent, or Firm*—Edgar W. Averill, Jr.

[57] ABSTRACT

A slip-on seat belt tension adjustment clip for relieving the tension from the shoulder strap of a seat belt assembly. The clip is made from a flexible polymer and is one piece. It has a handle with two outwardly extending clip arms. One of the clip arms has a convex curve along its inner surface and the other clip arm is spaced a constant distance from the first clip arm. A user may simply slip on the clip adjacent the guide loop and relieve the normal constant tension which otherwise exists in the shoulder strap. The clip may then be easily removed by pulling it off.

5 Claims, 2 Drawing Sheets

SLIP-ON SEAT BELT TENSION ADJUSTMENT CLIP

BACKGROUND OF THE INVENTION

The field of the invention is devices for adjusting the tension in the shoulder strap of seat belts of the type used in motor vehicles. Several clip designs have been devised for the specific purpose of relieving the tension existing in the shoulder strap of a seat belt assembly of the currently popular style. Such style has a tension reel which exerts a continuous slight tension on the shoulder strap and lap belt of the seat belt assembly. The shoulder strap passes through a guide loop affixed to the side of a vehicle above the wearer and the tension is transferred over the loop to the point where the shoulder strap is snapped into the seat belt buckle.

A seat belt retaining clip is shown in design Pat. No. 302,627. Being a design patent there is no suggestion as to how the clip might be used. A releasable strap encircling member is shown in U.S. Pat. No. 3,646,644 assigned to Ford Motor Co. The device is used to relieve the tension from the retracting apparatus of the shoulder strap. U.S. Pat. No. 4,289,352 shows a shoulder height adjuster for seat belt systems which might have some effect on the shoulder strap tension. U.S. Pat. No. 4,810,036 shows a device with four rods which is placed over the seat belt and contacts the upper guide loop of the shoulder strap assembly.

U.S. Pat. No. 4,826,250 shows a three-piece device which can be tightened over the shoulder strap adjacent the guide loop. U.S. Pat. No. 5,201,099 shows a hinged clip which may be placed over the seat belt and the shoulder belt at a location so that the shoulder belt does not rub against the neck of a seat belt wearer.

While all of these devices are capable of improving wearer comfort they tend to be somewhat difficult to use or be made from several separate pieces increasing the cost of making or the difficulty of using the device.

BRIEF SUMMARY OF THE INVENTION

It is an object of the present invention to provide a one-piece slip-on seat belt tension adjustment clip which may be easily inserted on and removed from the shoulder strap of a seat belt assembly.

The present invention is for a slip-on seat belt tension adjustment clip for removably affixing to the shoulder strap of a seat belt assembly of the type which has a shoulder strap which is maintained under continuous tension. This type of seat belt has a guide loop through which the shoulder strap passes which is typically affixed to the side of the vehicle. The clip may be used by inserting it adjacent the passenger side of the guide loop so that the tension reel cannot pull the strap against the user's chest. The seat belt tension adjustment clip comprises a single clip body fabricated from a flexible polymer. The single clip body has a handle portion with a pair of outer finger grasping surfaces. A first clip arm extends away from the handle portion and has an outer surface and an inner belt contacting surface. The inner belt contacting surface has a convex cross-sectional shape extending over a major portion of the cross-section of the inner belt contacting surface. A second clip-on arm extends away from the handle portion parallel to and overlying the first clip arm. The second clip arm has an outer surface and an inner belt contacting surface. The inner belt contacting surface has a matching shape as the inner belt contacting surface of the first clip arm, but elastically separable therefrom to provide a seat belt gap. The clip arm flexibility is sufficient to permit the clip to be easily pushed over the shoulder strap portion of the seat belt assembly and yet, because of the curved shape of the belt contacting surfaces of the two arms, will hold the belt so that it will not pass through the guide loop. It, thus, can be used to relieve the tension on the wearer.

DESCRIPTION OF THE PREFERRED EMBODIMENTS

Figure 1:
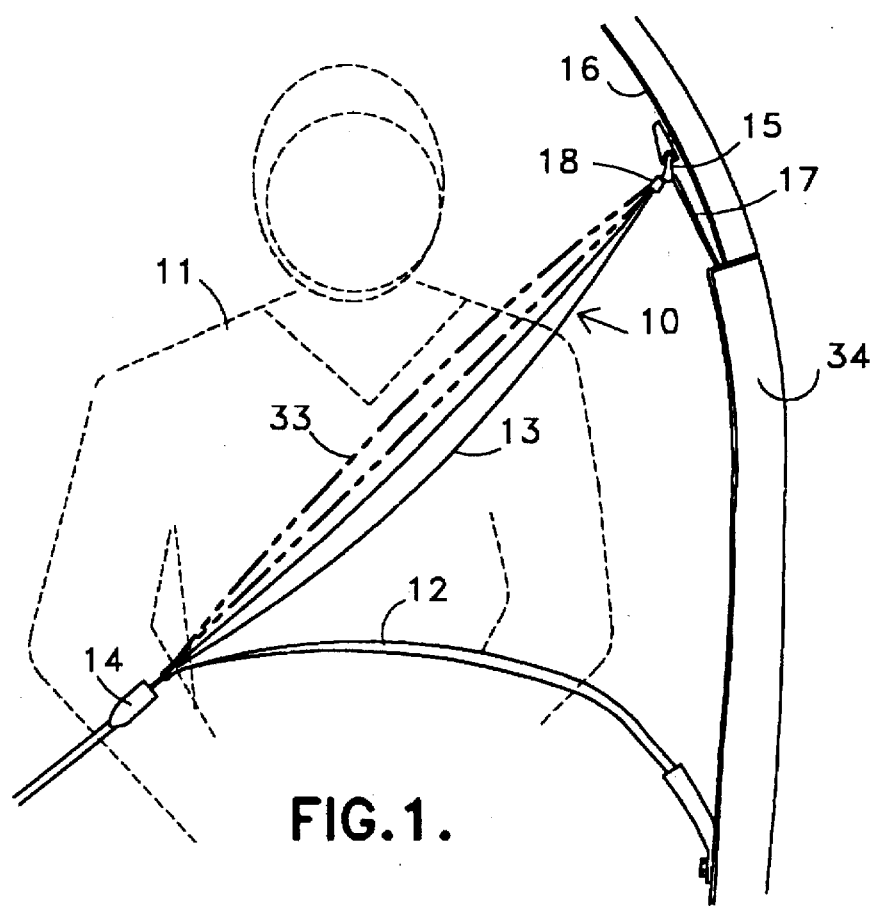
FIG. 1 is a front view of a seat belt wearer and seat belt assembly utilizing the slip-on seat belt clip of the present invention.
Figure 2:
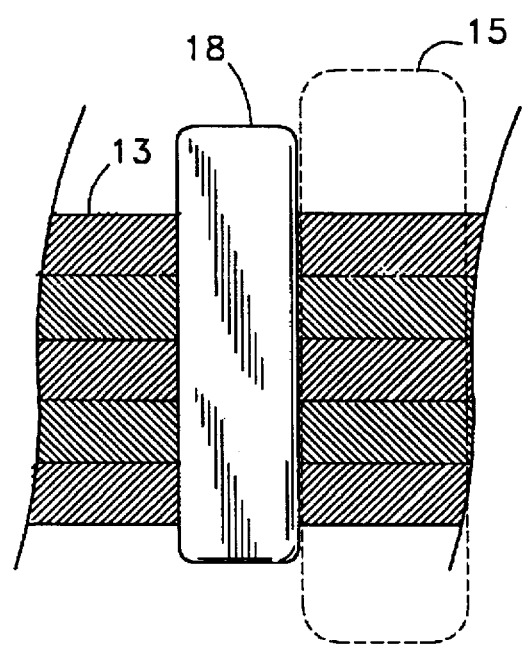
FIG. 2 is a top view of the slip-on seat belt clip of the present invention shown over a length of a seat belt.
Figure 3:
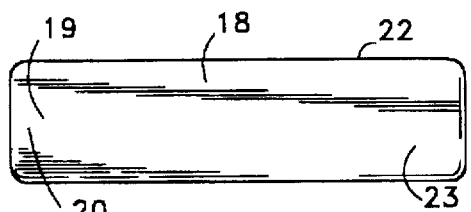
FIG. 3 is a top view thereof.
Figure 4:
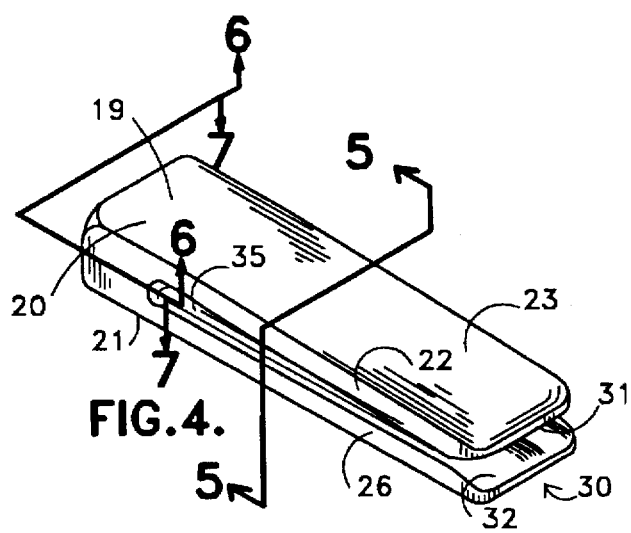
FIG. 4 is a perspective view thereof.
Figures 6, 7:
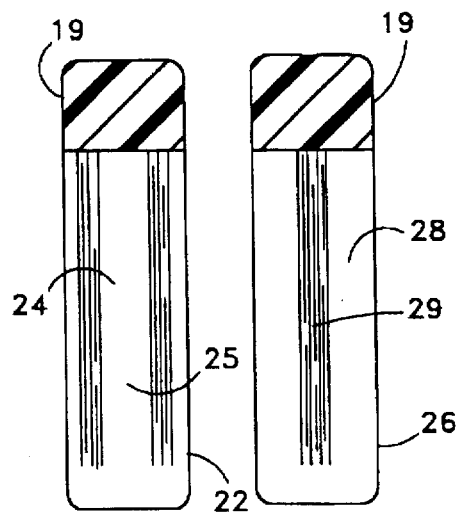
FIG. 6 is a cross-sectional view taken along line 6—6 of FIG. 4.
FIG. 7 is a cross-sectional view taken along line 7—7 of FIG. 4.
Figure 5:
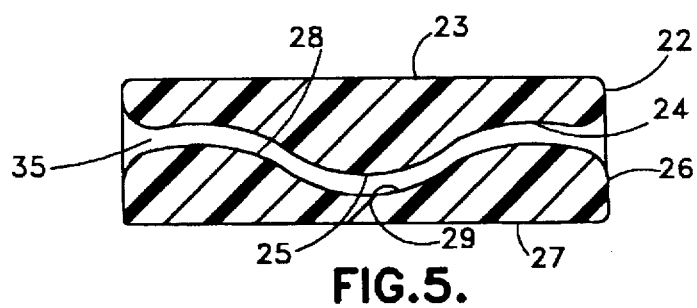
FIG. 5 is a cross-sectional view taken along line 5—5 of FIG. 4.

A seat belt assembly is shown in FIG. 1 and indicated by reference character 10 and is affixed over a passenger 11 shown in hidden lines. Seat belt assembly 10 has a lap belt portion 12 and a shoulder belt portion 13. A buckle assembly 14 holds the lap belt and the seat belt over the passenger 11.

A guide loop 15 is affixed to the side 16 of the vehicle and a portion 17 of shoulder belt 13 passes downwardly to an automatic retracting apparatus comprising a tension reel the location of which is indicated by reference character 34 in FIG. 1. The automatic retracting apparatus applies a continuous tension through guide loop 15 which can be uncomfortable to passenger 11. This discomfort can be eliminated by the use of the slip-on seat belt tension adjustment clip 18 of the present invention. Clip 18 is shown in FIGS. 2 through 7 and is a single molded part made from a flexible polymer. Clip 18 has a handle portion 19 which has first and second outer finger grasping surfaces 20 and 21. A first clip arm 22 extends away from handle portion 19. It has an outer surface 23 and an inner belt contacting surface 24 shown best in FIGS. 5, 6 and 7. Inner belt contacting surface 24 has a convex shape as shown best in FIG. 5 and has a central ridge 25 running essentially the full length thereof. A second clip arm 26 also extends away from the handle portion 19 and is parallel to and adjacent the first clip arm. The second clip arm has an outer surface 27 and an inner belt contacting surface 28. Inner belt contacting surface 28 has a shape which matches the shape of the inner belt contacting surface of the first arm as shown best in FIG. 5 and thus, has a central valley 29 extending essentially the full length thereof. The two belt contacting surfaces 24 and 28 are separated about 1/16 of an inch where the arms contact the handle portion 19 so that the clip may be easily pushed onto a seat belt and equally easily removed while still having sufficient tension against the belt to prevent it from feeding through guide loop 15. Typically, clip 18 has a curved or angled clip opening 30. A curved surface 31 is shown at the outer end of clip arm 22 and a curved surface 32 is shown on the outer end of clip arm 26. Preferably arms 22 and 26 are elastically positioned so that when at rest they about touch one another near curved surfaces 31 and 32. Their elasticity easily allow the clip to be pushed over a belt.

Thus, in use, the passenger merely puts on the seat belt and pulls the shoulder strap a short distance, such as ½" and inserts the clip 18 adjacent the inner side of guide loop 15. Thus, as the shoulder belt 13 is released, clip 18 abuts guide loop 15 and eliminates the tension exerted along portion 17 of shoulder belt 13. The normal shoulder belt position is shown in phantom view in FIG. 1 and indicated by reference character 33. The position shown in phantom view can cause driver or passenger discomfort which is easily eliminated by clip 18. The clip can be very economically made by injection molding, is intuitive to use and is effective for the purpose intended. The clip is preferably 2¾" long and ¾" wide. Its height is preferably 7/16" and the finger grasping portion is preferably about 9/16". This leaves a clip-on length of about 2¼" which completely crosses the shoulder belt during use. The maximum amount of curvature in the inner surfaces from the base of the convex portion 25 to the high point of inner surface 24 is preferably about 1/16th of an inch. The inner seat belt gap 35 adjacent handle 19 is preferably about ⅛ of an inch. The outer seat belt gap 36 may be almost nothing since the clip arms are flexible. The device may be easily stored when removed by simply clipping it over another portion of the seat belt assembly or left in place on the belt.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A slip on seat belt tension adjustment clip removably affixable to a shoulder strap of a seat belt assembly of the type which has a shoulder strap which is maintained under continuous tension and which shoulder strap passes from a tension reel through a guide loop affixed to a vehicle interior side which strap passes from the guide loop across the chest of the user to a seat belt buckle assembly, said seat belt tension adjustment clip comprises:

a single clip body fabricated from a flexible polymer, said single clip body having a handle portion with a pair of outer finger grasping surfaces;

a first clip arm extending away from said handle portion, said first clip arm having an outer surface and an inner, belt contacting surface, said inner, belt contacting surface having a lateral cross-section including a convex central portion which is bordered by concave side portions extending over a major portion of the cross section of the inner, belt contacting surface; and a second clip arm extending away from said handle portion generally parallel to and adjacent said first clip arm, said second clip arm having an outer surface and an inner, belt contacting surface having a matching shape as the shape of the inner, belt contacting surface of the first clip arm but separated therefrom a distance of about 1/16 of an inch at said handle portion to provide a seat belt gap having an internal end and an external end whereby the adjustment clip may be simply pushed over a shoulder strap adjacent the guide loop to eliminate the continuous pressure of the shoulder strap on a user's chest.

2. The slip on seat belt tension adjustment clip of claim 1 wherein said first and second clip arms are about 2¼" long.

3. The slip on seat belt tension adjustment clip of claim 1 wherein the handle portion is about 9/16" long.

4. The slip on seat belt tension adjustment clip of claim 1 wherein said seat belt gap has a widened entrance portion at the external end thereof.

5. The slip on seat belt tension adjustment clip of claim 1 wherein said convex central portion of said first clip arm has a height of about ⅛th of an inch.

* * * * *